Sept. 6, 1932.  C. WOOD  1,875,400

COUPLING DEVICE

Filed Dec. 3, 1931

INVENTOR:
CHARLES WOOD.

Marks &Clerk
BY  ATTORNEYS.

Patented Sept. 6, 1932

1,875,400

UNITED STATES PATENT OFFICE

CHARLES WOOD, OF LIVERPOOL, NOVA SCOTIA, CANADA, ASSIGNOR TO MERSEY PAPER COMPANY, LIMITED, OF BROOKLYN, NOVA SCOTIA, CANADA, A CORPORATION OF NOVA SCOTIA

COUPLING DEVICE

Application filed December 3, 1931. Serial No. 578,753.

This invention relates to coupling devices and has for object to provide a device which is quickly attachable and detachable, and at the same time affords a maximum of safety and security with a minimum number of very simple parts.

The improved device is applicable to many different uses and is especially useful in situations wherein heavy loads are involved. For example, it may be employed in connection with pulpwood loaded in chain slings, or newspaper rolls loaded in wire or rope slings, or to connect safety chains joining railway cars. In small sizes it may also be used for smaller loads where great security is desired, for example, to couple watches to watch chains, or as a coupler for jewelry of any kind.

The device is of simple construction and easy to manipulate, and provides a maximum of security without the employment of any parts which are liable to stick or break, such as springs, clips, latches and the like.

With these objects in view the invention consists in the construction, combination and arrangement of parts hereinafter described and more particularly pointed out in the appended claim.

Figure 5:
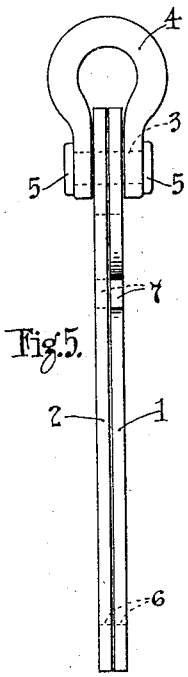

Referring now to the accompanying drawing which illustrates, by way of example, one convenient embodiment of the invention, Figures 1, 2, 3 and 4 are front elevations of the improved device in various positions to be later described, and Figure 5 is a side elevation of the device.

The illustrated form of the invention comprises a pair of slotted members 1 and 2 pivotally connected by a pin 3. A U-shaped loop or link 4 is provided with aligned holes at its ends and holds the members 1 and 2 in sliding, pivotal engagement with each other. The pin 3 is formed with heads 5 so that all the parts are held secured together without interfering with the relative pivotal movement of the parts 1, 2 and 4.

The members 1 and 2 are formed with straight slots 6 and on one side of each member, at a point near the pivot 3, a gap or opening 7 is provided. The members 1 and 2 are identical with each other except in that they are so assembled that the gaps 7 are disposed on opposite sides of the respective slots 6.

Figure 3:
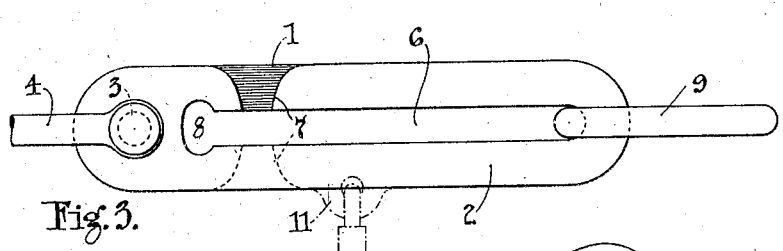

At the end of the slots 6 adjacent the pivot 3, recesses or enlargements 8 are provided which are wider than the slots, and when the members are in closed position, as indicated in Figure 3, the slots 6 and recesses 8 register with each other.

The device may be used for a great many different purposes. The loop 4 and a link 9 are respectively connected to the objects to be coupled together. For example, the loops 4 and 9 may be respectively connected to opposite ends of a chain, cable, rope or the like, indicated at 10, or the loop 4 may be connected to a hoisting mechanism and the link 9 to a load of any kind.

Figure 1:
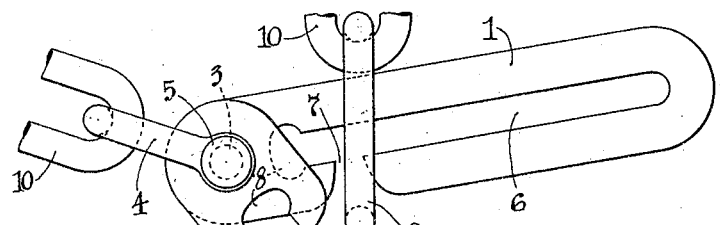

The link 9 is engaged with the members 1 and 2 in the manner illustrated in the drawing. The members 1 and 2 are swung open in such manner that the gaps 7 are on the inside of the members as shown in Figure 1. The link 9 is then looped over one of the members 1 or 2 and moved up to a position adjacent the gaps 7, as indicated in Figure 1. The members 1 and 2 are then swung to closed position and the link 9 passes through both of the gaps 7, see Figure 2.

When the members 1 and 2 reach the closed position the link 9 is moved to the free end of the slots 6, see Figure 3.

The diameter of the cross section of the link 9 is substantially equal to the width of the slots 6 and also to the narrowest part of the gaps 7. That is to say, the link can just pass through the gaps, and has a sliding fit in the slots 6. Thus the link 9 automatically locks the two members 1 and 2 subtsantially in alignment and the risk of the link accidentally moving out through one of the gaps 7 is reduced to a negligible minimum. It will be noticed that the uninterrupted side of each coupling member closes the gap 7 in the other member. It will also be observed that this locking action is accomplished without the aid of any of the customary clips, catches, springs or the like.

So long as the device is under tension the link 9 is compelled to remain at the free end of the members 1 and 2 in a position far removed from the gaps 7, and therefore has no tendency to move towards the gaps. If the tension is relaxed by removing the load, the link 9 will still remain at the free end of the members 1 and 2 unless some force tilts the free end of the device upwardly, in which event the link 9 will slide down to the end of the slots 6 adjacent the pivot 3. In order to pass from the free end to the pivoted end of the device, the link 9 must, of course, slide past the gaps 7, but as the tilting of the device always occurs rapidly the motion of the link along the slot is also rapid, and consequently the link slides quickly past the gaps 7 without having any tendency to pass through them.

Figure 4:
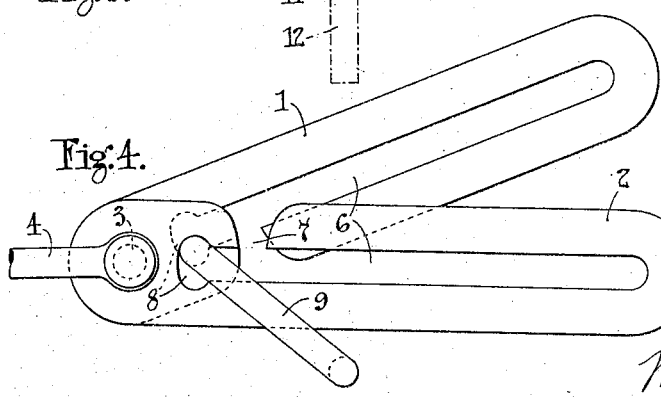

The link 9 thus enters the recesses or enlargements 8 and the tendency is for the link 9 to be retained in the recesses at the pivoted end of the device in the manner indicated in Figure 4. In this idle position, therefore, the link 9 is prevented from moving to the gaps 7.

When the link 9 is again loaded the members 1 and 2 are automatically compelled to swing into alignment before the link 9 can leave the recesses 8, and as the resumption of the load is usually a sudden operation, and the gaps 7 are arranged close to the recesses 8, the link 9 is snapped quickly past the gaps to the operative position shown in Figure 3.

Therefore, in practice the link 9, or equivalent member, is always located at one end of the slots 6 or the other, the link having no inclination or tendency to remain at any intermediate position.

Figure 2:
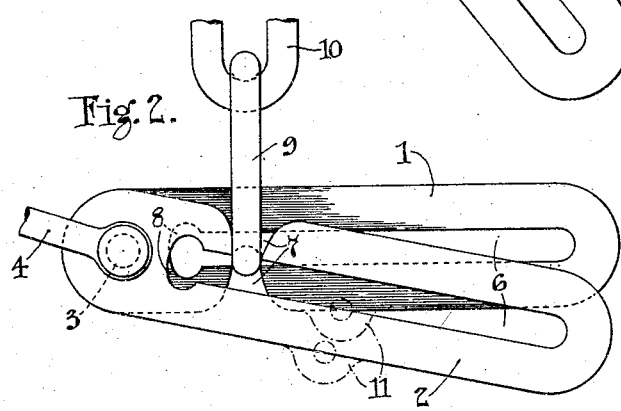

If for any purpose it should be desired actually to lock the members 1 and 2 together, the members may be formed with perforated lugs 11 to receive a padlock 12, as indicated in dotted lines in Figures 2 and 3.

I claim:

A coupling device comprising a plurality of flat, elongated members arranged face to face, a connecting loop, and means for pivotally connecting said members and loop together adjacent one end of said members, a slot of substantially uniform width extending longitudinally of said members and gaps in said members near the pivoted ends thereof and arranged equidistant from the pivot and facing in opposite directions, said slots being provided at the end adjacent the pivot with coacting locking recesses which are wider than the remaining part of the slot.

In testimony whereof I have affixed my signature.

CHARLES WOOD.